JOHN F. VINTON & GEORGE A. HINES.

Sheet No. 1.
3 Sheets.

Improvement in Permutation Locks.

No. 120,915.

Patented Nov. 14, 1871.

Witnesses.
W. H. Vinton.
Geo. W. Brown.

Inventors.
John F. Vinton
George A. Hines

JOHN F. VINTON & GEORGE A. HINES.
Sheet No. 2.
3 Sheets.
Improvement in Permutation Locks.
No. 120,915.  Patented Nov. 14, 1871.
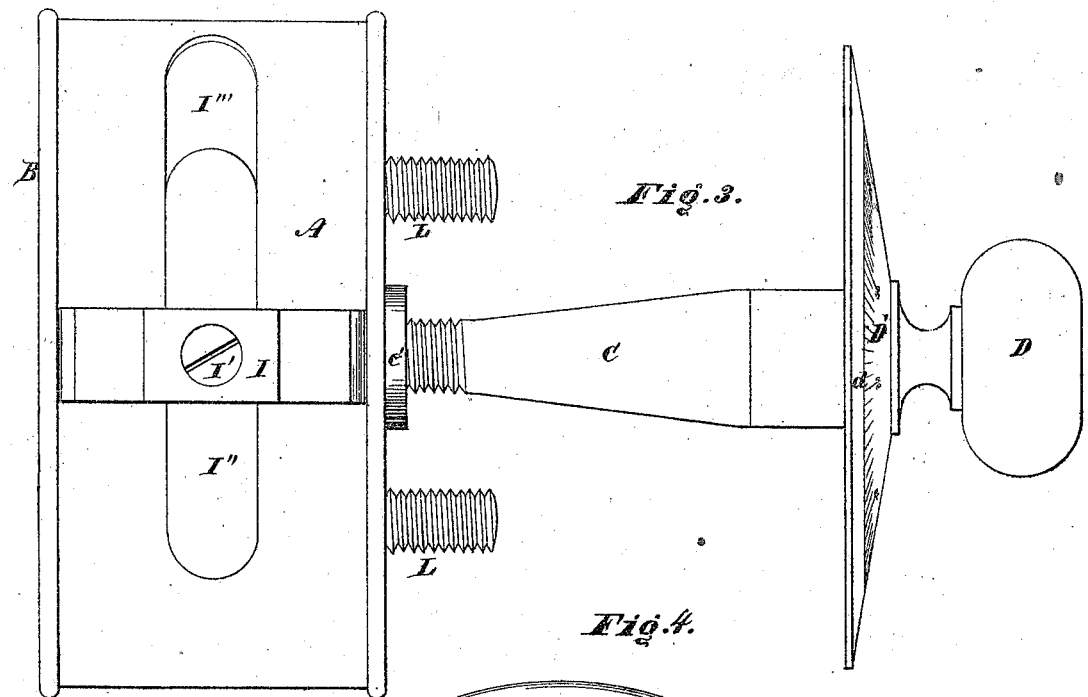
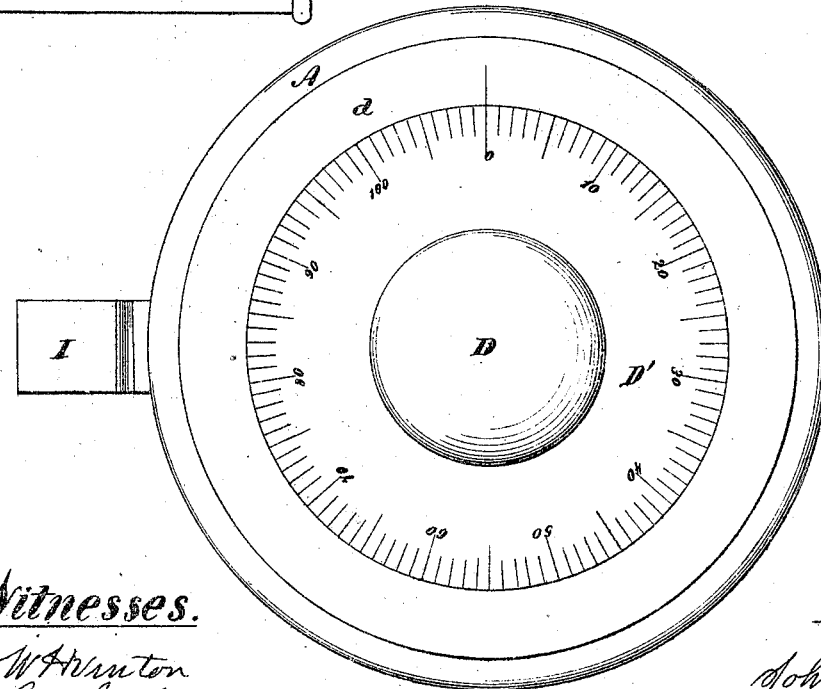
Witnesses.
W. H. Vinton
Geo. W. Browne
Inventors.
John F. Vinton.
George A. Hines.

JOHN F. VINTON & GEORGE A. HINES.
Sheet No. 3.
3 Sheets.
Improvement in Permutation Locks.
No. 120,915.
Patented Nov. 14, 1871.
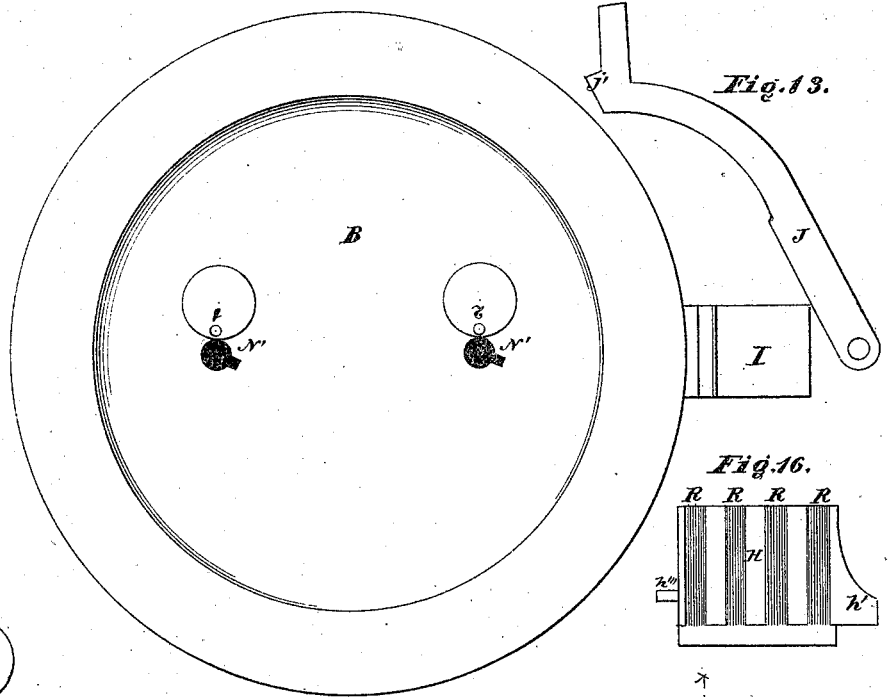
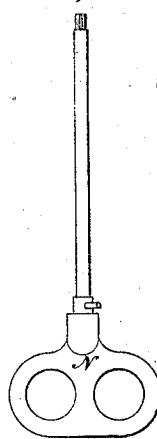
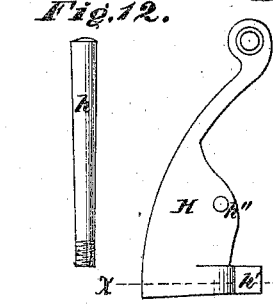
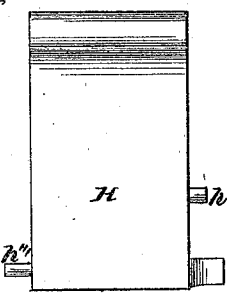
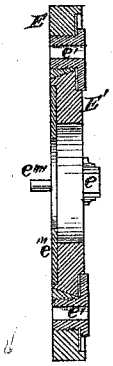
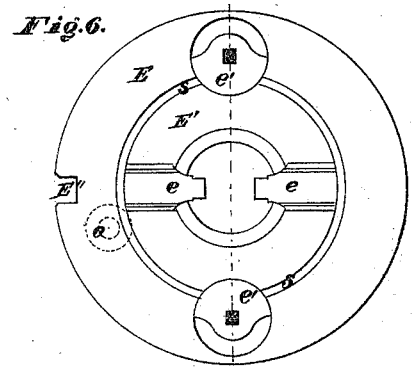
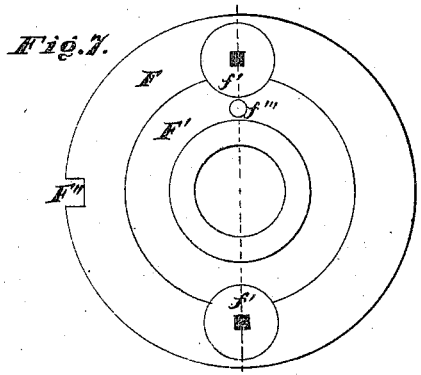
Witnesses.
W H Vinton
Geo. W. Browne
Inventors.
John F Vinton
George A Hines 120,915

UNITED STATES PATENT OFFICE.

JOHN F. VINTON AND GEORGE A. HINES, OF BRATTLEBOROUGH, VT., ASSIGNORS OF ONE-THIRD THEIR RIGHT TO SEYMOUR FIELD, OF SAME PLACE.

IMPROVEMENT IN PERMUTATION LOCKS.

Specification forming part of Letters Patent No. 120,915, dated November 14, 1871.

*To all whom it may concern:*

Be it known that we, JOHN F. VINTON and GEORGE A. HINES, of Brattleborough, in the county of Windham and State of Vermont, have invented certain new and useful Improvements in Combination Locks; and we do hereby declare that the following is a full, clear, and exact description thereof, which will enable others skilled in the art to make and use the same, reference being had to the accompanying drawing forming a part of this specification.

Figure 1:
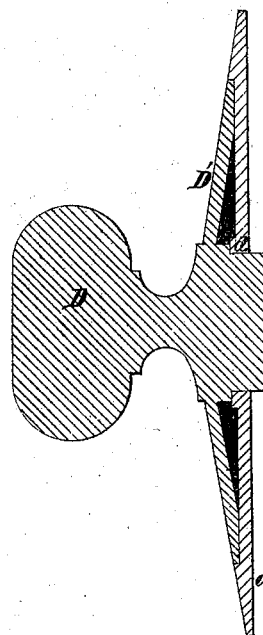
Figure 1:
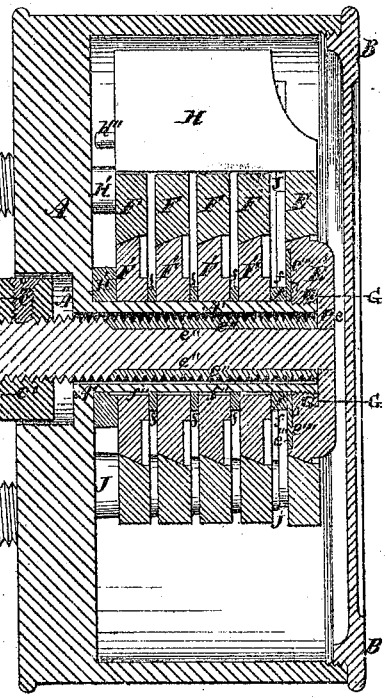
Figure 2:
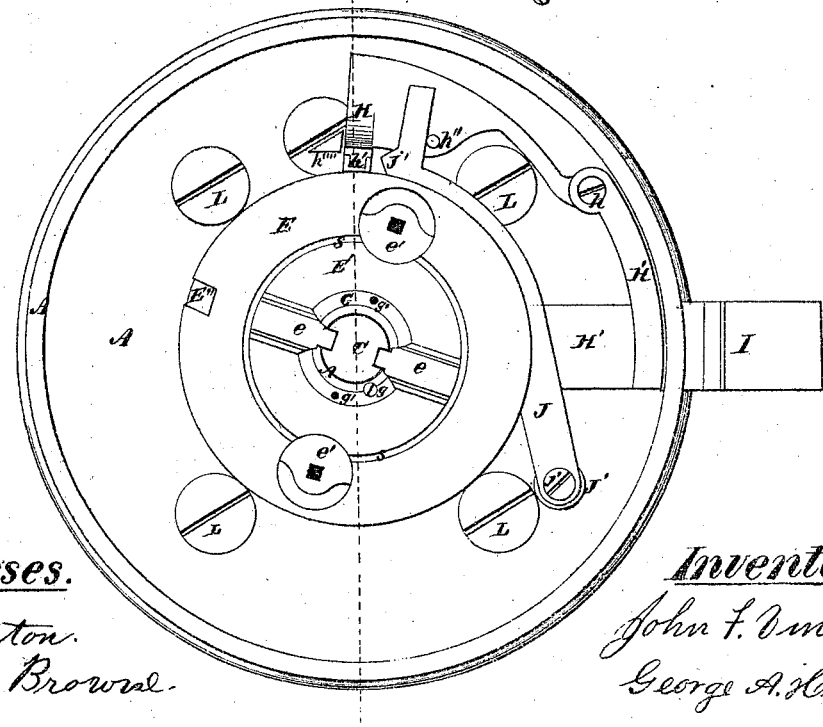

Figure 1 is a vertical central and longitudinal sectional elevation of the lock; Fig. 2, a rear view, with the cover removed; Fig. 3, a plan view. Figs. 4 and 5 are, respectively, front and rear views of the lock; Fig. 6, a face and sectional cross view of the driving-wheel; Fig. 7, a similar view of one of the disk-tumblers; Fig. 8, a side and plan or top view of the locking-dog. The remaining figures represent other parts of the lock, which will be fully described hereinafter.

Similar letters of reference indicate corresponding parts.

Our invention mainly consists in an improved arrangement of mechanism with the bolt, locking-dog and its lever, the driving-wheel and its inner ring, and a tubular bearing connected with the spindle; the object being to produce a lock simple in construction, not liable to get out of order, and hence reliable in operation and capable of effectually resisting improper attempts to manipulate it.

Its construction and operation are as follows:

The knob D and dials D' of our lock are rigidly connected, and the latter fits and turns in the dial-plate $d$, which is designed to be secured to the door of the safe or vault. The tapered steel spindle C is made of such length as to pass through both the door and lock, and has a screw connection with the dial, as shown at $c$. The inner or reduced end of the spindle is screw-threaded to allow it to receive the nut $c'$, which is locked by the clamp-screw $c'''$, and is arranged in a chamber or recess, A'', of the cylindrical case A, which is made larger than the said nut in order to prevent communication of a shock to the case by blows or jars received by the outer end of the knob or spindle. The tubular bearing A' of the tumblers F is rigidly connected with the case A, and fits over or receives the screw-threaded end of the spindle. The former has a longitudinal groove or slot, $f''$, to receive teats or projections of the collars $f$, and thus prevent them from turning with the tumblers. The spindle has also two shallow longitudinal grooves on opposite sides thereof to receive the splines $e\ e$, which are attached to the driving-wheel E E', and hence connect the two so that they turn together. The said driving-wheel and tumblers are each made in two parts or rings, one fitting within the other. The inner ring E' and outer ring E of the driving-wheel are beveled on their respective outer and inner edges, as shown in Figs. 2 and 6, and are clamped firmly together by screws $e'\ e'$, Fig. 2, which pass through the outer ring E, one on each side, and come to a bearing on the inner one E'. Square holes are formed in them to receive an operating-key, N, Fig. 15, and their heads are countersunk in the ring E and cut away on one side, as shown. A rabbet or shoulder, S, is formed around the outer edge of the ring E' to the depth of the counter-bores in E, so that when the screws are turned and the rings unclamped the cut-away sides of the screw-heads will remain in contact with the shoulder, and, while allowing the rings to turn freely and independently, holds them together. When the rings are to be clamped the inner one must be turned till the uncut portions of the screw-heads will enter the corresponding recesses or counter-bores therein. The means of connection between the driving-wheel and the bearing A' consists of the nut G, which screws on the end of the latter, and is held in a recess of the ring E' by the splines $e\ e$ on the outside and the annular plate $e'''$ on the inside. A clamping-screw, $g$, may be employed (if found necessary) for keeping G in place on A'. To screw G to its place a suitable instrument is applied to it by means of the holes $g'\ g'$. The two parts F F' composing each tumbler are clamped together, substantially like the rings of the driving-wheel, by means of the screws $f'\ f'$. $f'''\ f'''$ are the driving-pins of the tumblers, and $e''$, Fig. 6, the pin in E', through which motion is communicated to the tumblers. The locking-dog H is pivoted to the arm H' of the bolt I and turns freely on the tapered pin $h$, Fig. 12. Its opposite end $h'$ rests on the periphery of the driving-wheel, which is slightly larger than the tumblers, so that the dog can touch them but once during one revolution of the spindle. A notch, E'', is formed in the driving-wheel, and a corresponding one, F'', in the tumblers, to receive the dog H, the edges of the former being also slightly rounded to facilitate engagement and disengagement of the same. In order to prevent any jar, shock, or clicking noise when the dog strikes the tumblers, holes are drilled in the end $h$ and the same filled with hair. $h'''$ is a pin, projecting laterally from the dog H, Fig. 8, which, in the operation of the lock, is carried up on the inclined projection or pin $h''''$, Fig. 14, that is fixed in the back of the lock-case. When the bolt I has come to its locked position the dog H drops into the driving-wheel and the pin $h'''$ drops behind the pin $h''''$, which prevents the bolt from being thrown by any outside influence until the tumblers have received the dog and are in position to unlock. The bolt I is attached to the arm H' by a screw, I', it having a projection, $i$, Fig. 10, which passes through a slot in the case of the lock and into the recess $i'$ in said arm. A thin curved plate, I'', covers the slot in which the projection $i$ travels. A small space is left between the shoulder of the screw I' and the bolt I, and enough curvature is given to I'' to press the bolt I up against the shoulder of I', so that when the bolt is pressed hard against the bolt I no strain can come upon the interior work of the lock. I''' is a shallow bed, in which I'' travels. J is a bent lever, hung, by means of screw $j$, on the stud J'', just back of the driving-wheel. When the operation of unlocking is being effected the pin $h''$, fixed in H, carries the lever forward; and when the return motion is made the end $h'$ of the dog H catches on the point of the lever at $j$, and as the motion is continued is lifted out of the slots or notches of the tumblers; the motion being still further continued, the pin O, Fig. 11, strikes against the lever J, carries it back against the pin $h''$, and as the pin O passes its center throws the bolt, dog, and lever into their locked positions. N' N', Fig. 5, are key-holes in the cover B of the lock to receive the combination keys, and L L are screws for attaching the lock to the door of a safe or vault.

To operate the lock proceed as follows: Turn the knob and dial four times to the right and enough more to bring the first number of the combination to the mark at the top of the dial-plate; three times to the left and enough to bring the second number to the mark; twice to the right and enough more to bring the third number to the mark; once to the left and enough to bring the fourth number to the mark; then slowly to the right until the dog engages the driving-wheel; then continue to the right to unlock. After the dog engages the tumblers and driving-wheel the continued motion of the driving-wheel to the right carries the dog with it, and thus at the same time swings the piece H' a certain distance about the common center, and H' in turn lifts the bolt I on its concentric arc. The door-bolt can now be turned back. To lock, turn to the left, when the dog will first engage with the point of the lever, which has been thrown forward by the former movement; and the movement to the left continuing, the lever lifts the dog from the slots onto the periphery of the driving-wheel and tumblers and leaves the pin $h'''$ on the point of the incline $h''''$. When the pin O comes round against the lever, the lever, bearing against the pin $h''$, carries the dog H, piece H', and bolt I back to place in their locked position. In going back the last distance the pin $h'''$ is carried up the incline $h''''$, and when it arrives at position drops behind it. The lock can be worked on reverse motions from the above when the combinations are set for the same. To change the combination, work the same as to unlock until the dog engages the tumblers and driving-wheel; then insert two keys, N, at the key-holes N' N'; turn the keys one-quarter round to the left; then proceed the same as to unlock, bringing the four chosen numbers to the mark on the dial-plate in turn; then turn to the right (or, if set on the reverse motion, to the left) until zero comes to the mark on the dial-plate; turn the keys quarter round to the right and withdraw them. The motion of unlocking and locking being now gone through with, the combination is changed.

What we claim as our invention, and desire to secure by Letters Patent, is—

1. The lever J, in combination with the pin O upon the driving-wheel and pin $h''$ on the dog H, substantially as and for the purpose set forth.

2. The combination of the nut G with the tubular bearing A' and driving-wheel E E', when said nut is arranged in a recess of the latter, as shown and described.

3. The combination of the driving-wheel E E', provided with the circumferential shoulder S, and clamping-screws with heads formed as described, for the purpose specified.

4. In the combination lock herein described, the bolt I, piece H', dog H, lever J, pins O and $h$, wheel E E', nut G, bearing A, grooved spindle C, tumblers F F', and collars $f f$, all relatively constructed, and arranged and operating as shown and set forth.

JOHN F. VINTON.
GEORGE A. HINES.

Witnesses:
W. H. VINTON,
GEO. W. BROWN. (93)